United States Patent

Murakami et al.

[11] 4,078,454
[45] Mar. 14, 1978

[54] SCREW EXTRUDER

[75] Inventors: Kenkichi Murakami, Osaka; Yoshiharu Kikuzawa, Takarazuka, both of Japan

[73] Assignee: Kabushiki Kaisha Plastic Kogaku Kenkyusho, Osaka, Japan

[21] Appl. No.: 677,897

[22] Filed: Apr. 19, 1976

[30] Foreign Application Priority Data

Apr. 18, 1975 Japan .................................. 50-47965

[51] Int. Cl.² ............................................. F16H 1/28
[52] U.S. Cl. ...................................... 74/802; 74/804; 74/640; 29/427; 425/192 R
[58] Field of Search .................. 17/40; 74/665 K, 801, 74/805, 802; 277/205; 29/427; 279/1 E

[56] References Cited

U.S. PATENT DOCUMENTS

| | | | |
|---|---|---|---|
| 1,317,455 | 9/1919 | Perrine | 279/1 E |
| 1,353,043 | 9/1920 | Hultberg | 279/1 E |
| 1,588,687 | 6/1926 | Richter | 29/427 |
| 2,186,064 | 1/1940 | Dekker | 74/801 |
| 2,508,121 | 5/1950 | McIver | 74/805 |
| 3,005,358 | 10/1961 | Musser | 74/801 |
| 3,013,447 | 12/1961 | Hils et al. | 74/805 |
| 3,052,915 | 9/1962 | Möller | 17/40 |
| 3,069,178 | 12/1962 | Rosen | 277/205 |
| 3,110,502 | 11/1963 | Pagano | 277/205 |
| 3,192,799 | 7/1965 | Pamplin | 74/805 |
| 3,214,999 | 11/1965 | Laff | 74/805 |
| 3,334,405 | 8/1967 | Cann et al. | 29/427 |

*Primary Examiner*—Benjamin W. Wyche
*Assistant Examiner*—Wesley S. Ratliff, Jr.
*Attorney, Agent, or Firm*—Armstrong, Nikaido & Marmelstein

[57] ABSTRACT

A screw extruder for molding plastics material having an extruding means mounted on a column standing on a pedestal: the extruding means consisting of a prime mover; an extruding unit, separated from the prime mover, having a screw unit equipped with a screw and a speed reduction unit composed of a planetary gear which transmits power to the screw unit, the reduction unit having an input shaft and output shaft aligned with the screw in turn, the output shaft being formed with a piercing hole extending therethrough, and the input shaft being formed with a piercing hole extending therethrough and communicating with the hole of the output shaft; and a transmission assembly for transmitting power from the prime mover to the reduction unit. The extruder is stable free from troubles such as turning over during the operation and transportation thereof and is easy to remove the screw from the screw unit in order to clean the inside thereof.

8 Claims, 8 Drawing Figures

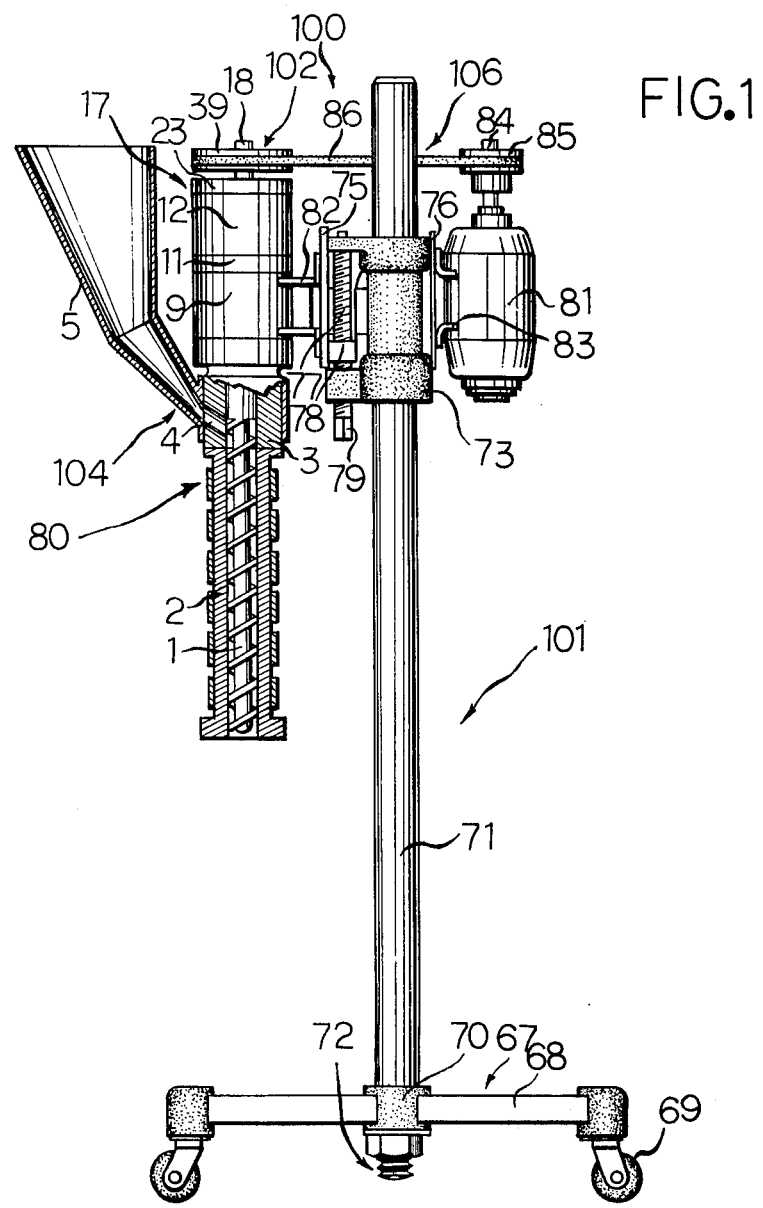
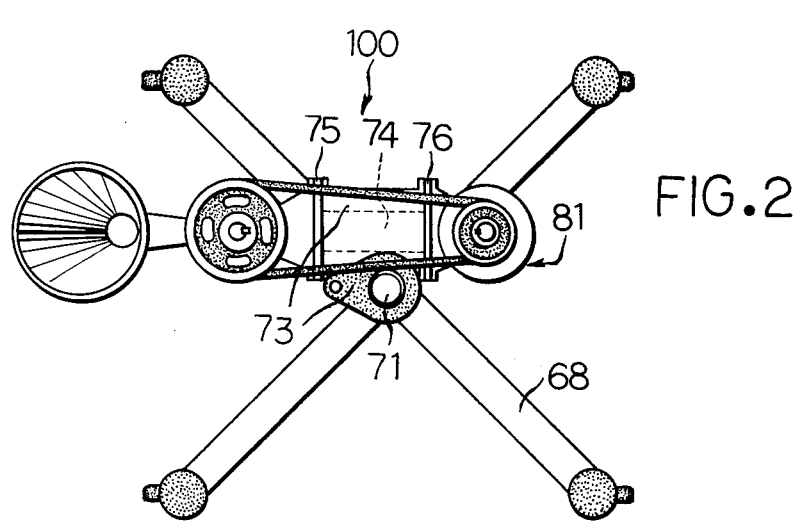

SCREW EXTRUDER

BACKGROUND OF THE INVENTION

The present invention relates to a novel and improved screw extruder for molding plastics material, and more particularly to a movable extruder having an extruding means mounted on a column standing on a pedestal.

An extruder of type employing a column needs to be stable free from troubles such as turning over during the operation and transportation thereof, even when the extruding means is located at a high position on the column, and therefore must fulfill the essential requirements that the extruding means is to be compact, light in weight and well-balanced. Further, to readily remove the screw from the screw unit in order to clean the inside thereof is another essential requirement in addition to those in economy, operability and the above-mentioned stability.

Conventional movable extruders generally provided with multiple stage ordinary reduction gear are expensive, large in volume and heavy in weight, since it needs from two to four reduction stages to get a suitable screw speed through the speed of the prime mover owing to comparatively small reduction ratio per one stage, which results from the fact that the arrangement and dimensions of parts contained therein are so restricted that the peripheries thereof should be surely aparted from the shaft supporting the screw and/or should not invade the cylindrical space behind the screw so as to form a shaft formed with a piercing hole into which a bar for removing the screw is insertionable from the backside of the gear box. Consequently, in the extruder employing such a multiple stage reduction gear, the bending moment applied to the column becomes remarkably large and therefore the stability thereof is aggravated, since the weight per power capacity is relatively heavy and the extruding means is to be sufficiently aparted from the column owing to the necessary large volume around the screw.

The worm gear has been often employed in the extruder instead of the multiple stage ordinary reduction gear. While a comparatively large reduction ratio is obtainable by a single stage worm gear, there are many troublesome deficiencies such as a tendency that the lubricant becomes overheated, a heavy weight, largeness in volume and short durability due to the abrasion of teeth caused by the friction cntact therebetween.

On the other hand, although the planetary gear is superior to the above-mentioned gears in viewpoint of the efficiency of power transmission, the compactness and lightness in weight, as well as silencity and less vibration and therefore is quite suitable for the extruder, especially for the movable extruder which is not fixed on a ground, it is difficult to install a device for removing the screw from the screw unit in order to clean the inside thereof, since it has generally an output and input shaft in axially aligned and the input shaft impedes to touch directly the end of the screw supported in the screw sleeve from the backside of the reduction unit. Therefore, the coventional extruder of column type has not adopted the planetary gear.

The conventional extruder has often utilized the extruding means which is devided into a screw unit not provided with a speed reduction means and a power source which includes a speed reduction gear and motor, or gearmotor. In that case, the extruder is apt to become out-of-balance since the weight of the power source is rather heavier than that of the screw unit, which is aggravated in accordance with the tendency in recent years employing a motor of larger power. Additionally, as for the device which transmits power from the power source to the screw unit, chain transmission should be employed, since the output shaft of the power source is rotated by large torque and low speed and the center distance is rather long. However, the chain transmission is not suitable for the extruder of column type in viewpoint of large noise and short durability when operated without lubricant.

The screw extruder of the invention having a well-balanced extruding means consisting of a extruding unit provided with a reduction gear and a prime mover is capable of employing a belt transmission and is therefore quite stable and silent during the operation.

In an extruder for molding plastics material, to readily remove the screw from the screw unit in order to clean the inside thereof is another essential requirement. The conventional extruder has often employed the mechanism therefor comprising a cap nut which is threaded onto the end of the screw sleeve supporting the screw and is formed with a threaded hole at the center portion thereof and a threaded bar which has an enough length to push the end of the screw and is threaded into the hole of the cap nut. In the conventional extruder employing the multiple stage ordinary reduction gear, although there are some aforesaid deficiencies, it is rather easy to equip with such mechanism owing to the comparative free arrangement of parts contained therein.

As for the extruder employing the planetary gear having an output shaft and input shaft aligned in a line, it is quite difficult to apply such mechanism, as mentioned above, and therefore the planetary gear has never been employed. The screw extruder of the invention can dissolve the difficulty by forming a piercing hole extending through the input shaft and output shaft. In other words, it can say that the extruder of the invention is accomplished as a result of conversion from this demerit into a merit.

A further problem concerning oil leakage from an oil room into the piercing hole in the shaft arises in case of the extruder equipped with a planetary gear. In the extruder employing the multiple stage ordinary reduction gear having a wide range of shaft arrangement, it is rather easy to devise a countermove against this oil leakage by separating the output shaft from the input shaft and by forming the output shaft, i.e. screw sleeve formed with a piercing hole therethrough extending until the backside of the gear box.

However, as for the extruder equipped with a reduction gear having an output shaft and input shaft aligned in a line, for instance, planetary gear, it is necessary to consider a satisfactory counterplan in order to preclude leaks from the oil room into the piercing hole communicating with the oil room at the gap between the opposing ends of input shaft and output shaft which are, of course, longitudinally to be separated each other due to the difference in speed.

The extruder of the invention employs a sealing mechanism consisting of a boss extending from the end of the output shaft and being inserted in the hole formed in the opposing end of the input shaft and an oil seal positioned between the boss and the opposing hole, or a boss extending from the end of the input shaft and being inserted in the hole formed in the opposing end of the output shaft and the oil seal.

OBJECTS OF THE INVENTION

It is an object of the present invention to provide a novel and improved extruder for molding plastics material.

Another object of the invention is to provide an extruder which is stable free from troubles such as turning over during the operation and transportation thereof, even when the extruding means is located at high position on the column.

Further object of the invention is to provide an extruder equipped with a device to remove the screw from a screw unit in order to clean the inside thereof.

More further object of the invention is to provide an extruder which is free from oil leakage into the piercing hole of the input and output shafts.

Other objects and advantages of the invention will become apparent from the following description of the embodiments with reference to the accompanying drawings.

BRIEF DESCRIPTION OF THE DRAWINGS

FIG. 1 is a partially cutaway side view showing an embodiment of the screw extruder of the present invention, FIG. 2 is a plan view of the screw extruder of FIG. 1.

DETAILED DESCRIPTION

Figure 3:
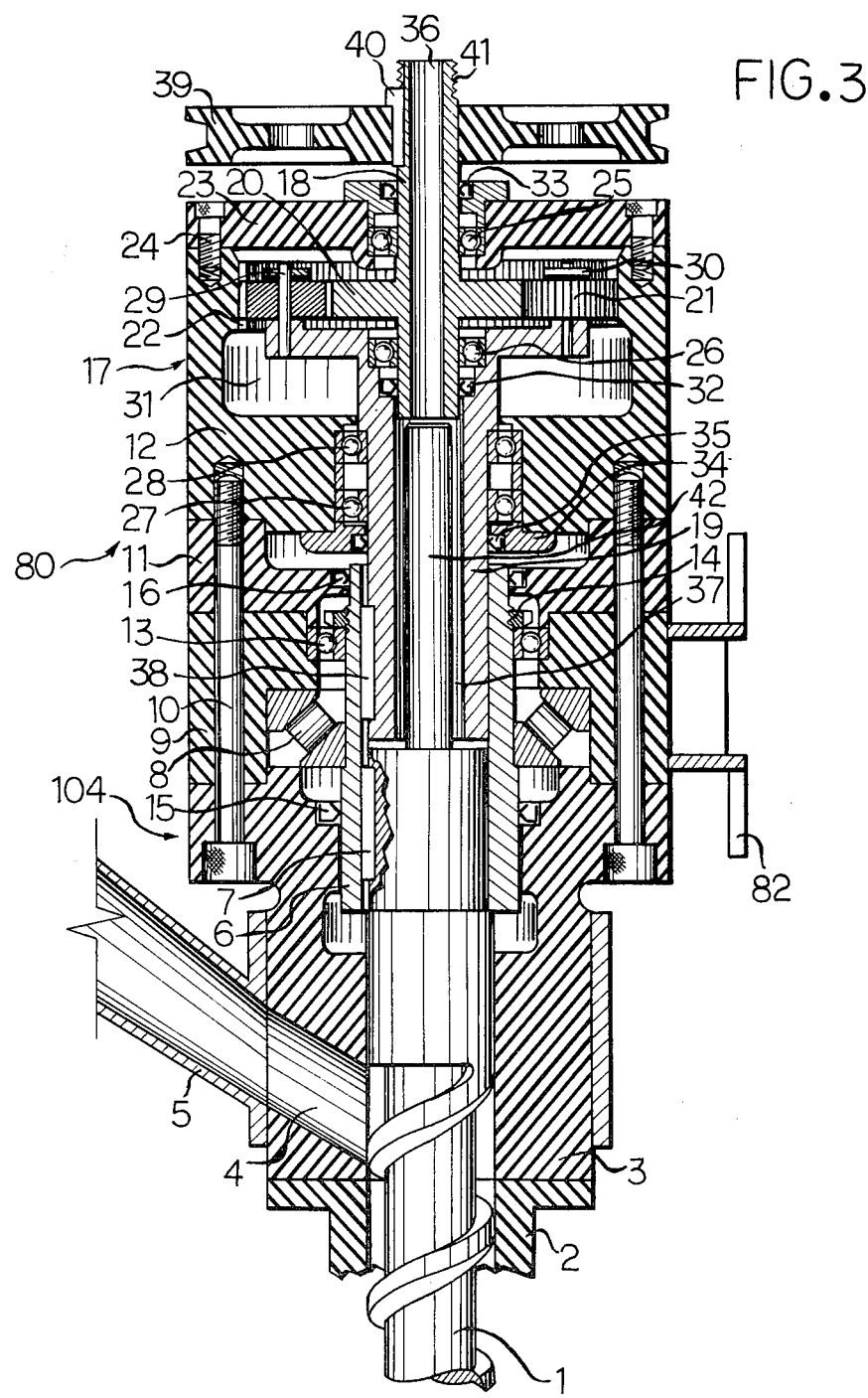
FIG. 3 is a partial view taken in longitudinal section through the extruding unit of FIG. 1.

It has now been found that aforesaid objects can be achieved by a screw extruder for molding plastics material having an extruding means mounted on a column standing on a pedestal: the extruding means consisting of a prime mover; an extruding unit, separated from the prime mover, having a screw unit equipped with a screw and a speed reduction unit composed of a planetary gear which transmits power to the screw unit, the reduction unit having an input shaft and output shaft aligned with the screw in turn, the output shaft being formed with a piercing hole extending therethrough, and the input shaft being formed with a piercing hole extending therethrough and communicating with the hole of the output shaft; and a transmission assembly for transmitting power from the prime mover to the reduction unit.

Referring to FIG. 1, the extruder 100 consists of a column assembly 101 and an extruding means 102 which includes an extruding unit 80 having a screw unit 104 and speed reduction unit 17, a prime mover 81 and a power transmission assembly 106.

With reference to FIG. 1 and FIG. 2, a pedestal 67 has four legs 68 equipped with wheels 69 on the downsides thereof extends radially from the boss 70 which is the central portion of the pedestal 67. As for the legs, any number more than three are available in the extruder. Wheels 69 for transferring may be removed in unnecessary case. The lower end 72 of the column 71 is inserted into a hole of the boss 70.

A bracket 73 mounted around the column 71 is slidable therealong up and down with the rotation of a feed screw (not shown). A rotatable shaft 74 is supported horizontally in a piercing hole which passes through the extended portion formed in the bracket 73. The rotatable shaft 74 and flanges 75, 76 fixed on each end of the shaft 74 are rotatable as one body.

A lever (not shown) formed with a longitudinal guide groove (not shown) projects from the flange 75. A guide member 78 with a piercing threaded hole is inserted slidably to the guide groove of the lever. A threaded bar 77 vertically disposed at the bracket 73 is put in the threaded hole of the guide member 78. The threaded bar 77 formed with a square portion at lower end thereof can be readily rotated by means of such a spanner. The lever rotates the rotatable shaft 74 according to the moved distance of the guide member 78 transferred up and down with the rotation of the threaded bar 77.

An extruding unit 80 equipped with feet 82 and fixed on the flange 75 by the feet 82 and a prime mover 81 equipped with feet 83 and fixed on the flange 76 by the feet 83 are inclined with rotation of the rotatable shaft 74 in accordance with the revolution of the threaded bar 77.

While DC motor or induction motor with a magnetic coupling is generally utilized for a prime mover, an induction motor with a variable speed changer is also available.

An input shaft 18 of the extruding unit 80 and an output shaft 84 of the prime mover are connected by means of a transmission assembly 106 consisting of a belt 86 and pulleys 39, 85.

Referring to FIG. 3, the extruding unit 80 includes a reduction unit 17 and a screw unit 104. As for the screw unit 104, a screw 1 is held in a cylinder 2 which is secured to the hopper mount 3 formed with a feeder hole 4 and equipped with hopper 5. The screw 1 is inserted into a screw sleeve 6 and is secured together by means of a key 7. The backpressure due to the reaction of discharge pressure during the extruding operation is applied to the thrust bearing 8 through the screw 1 and screw sleeve 6.

A connecting bolt 10 is employed to connect the screw unit 104 and the reduction unit 17 (that is, the hopper mount 3, a casing 9, and a spacer 11 are secured to the gear box 12). The screw sleeve 6 is concentrically and longitudinally positioned by means of the thrust bearing 8 and a radial bearing 13 which are tightened axially by way of a nut 14. Oil seals 15, 16 are used to avoid oil leakage from a room containing the above bearings 13, 8.

The reduction unit 17 consists of a gear box 12 and parts such as an input shaft 18, output shaft 19, solar gear 20 (number of teeth: S1), planetary gears 21 (number of teeth: P) and internal gear (number of teeth: S2) formed in the gear box 12. The planetary gears 21 are mounted on shatfs 29 and retained by means of collars 30.

In planetary gear employing a rotatable solar gear 20 mounted fixedly on the input shaft 18, stationary internal gear 22 and planetary gears 21 supported rotatably on the shafts 29 which are secured to a flange extending radially from the output shaft 19, the orbital motion of the planetary gears 21 around the solar gear 20, being induced as a result of relative rotation with the solar gear 20 and internal gear 21, is employed for the revolution of the output shaft 19. The reduction ratio between the input shaft and output shaft obtained in this gear arrangement is S1/(S1 + S2) as well known in the art. On the other hand, since the reduction ratio derived from an ordinary one stage gear arrangement having two gears which possess number of teeth S1 and S2, respectively, is S1/S2, it is obvious that the reduction ratio achieved by the planetary gear is higher than that by the ordinary gear arrangement. Bearings 25, 26 support the input shaft and oil seals 32, 33 are employed to preclude oil leaks from the oil room 31.

The output shaft 19 is supported by bearings 27, 28 and an oil seal 35 is located in the bearing cover 34. A piercing hole 36 formed in the input shaft 18 and a piercing hole 37 formed in the output shaft 19 are substantially isolated from the oil room 31 by means of the oil seal 32.

In this embodiment, a circular space for mounting the oil seal 32 is defined as a gap between a hole formed in the output shaft and a boss projected from the input shaft. To the contrary, however, the gap may be defined as a gap between a hole formed in the output shaft and a boss projected from the output shaft. Furthermore, without employing any elongated boss which is inserted into the hole of the opposing shaft, a suitable sealing device such as mechanical oil seal which is mounted on at least one shaft selected from the group consisting of the input shaft and output shaft and can seal a gap between the opposing ends of shafts by face to face sealing contact is available for this purpose.

The screw sleeve 6 is fastened to the output shaft 19 with a key 38. In this way, torque in the input shaft 18 is transmitted to the screw 1 through the planetary gears 21, output shaft 19 and screw sleeve 6.

A pulley 39 is fixed on the input shaft 18 by means of a key 40. The input shaft 18 is formed with a threaded end 41. An elongated boss 42 which is insertionable into the piercing hole 37 of the output shaft 19 extends from the end of the screw 1. The pulley 39 is driven by the prime mover through the belt 86. A rear plate 23 is fastened to the gear box 12 with bolts 24.

Figure 4:
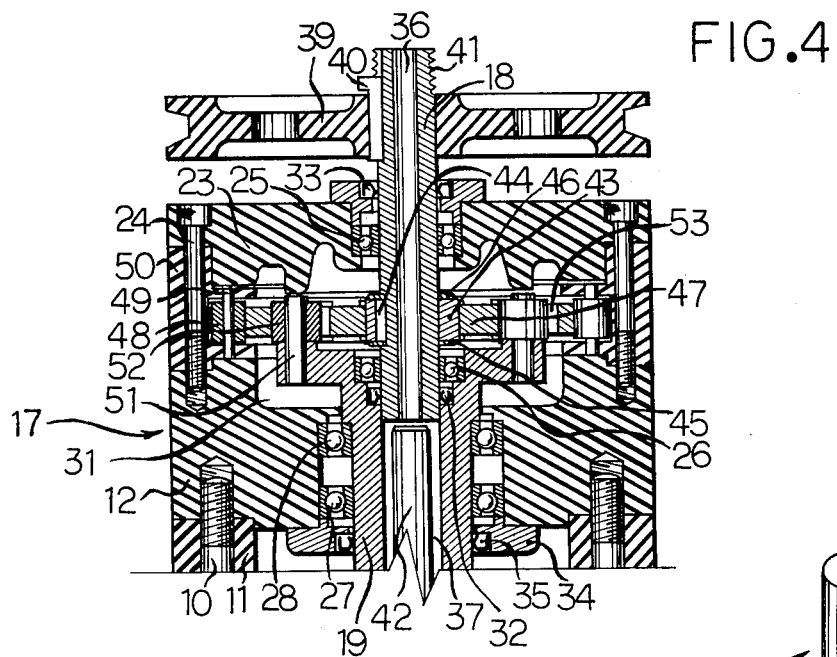
FIG. 4 is a longitudinal section view showing another embodiment of a reduction gear in the extruding unit of FIG. 3.
Figure 5:
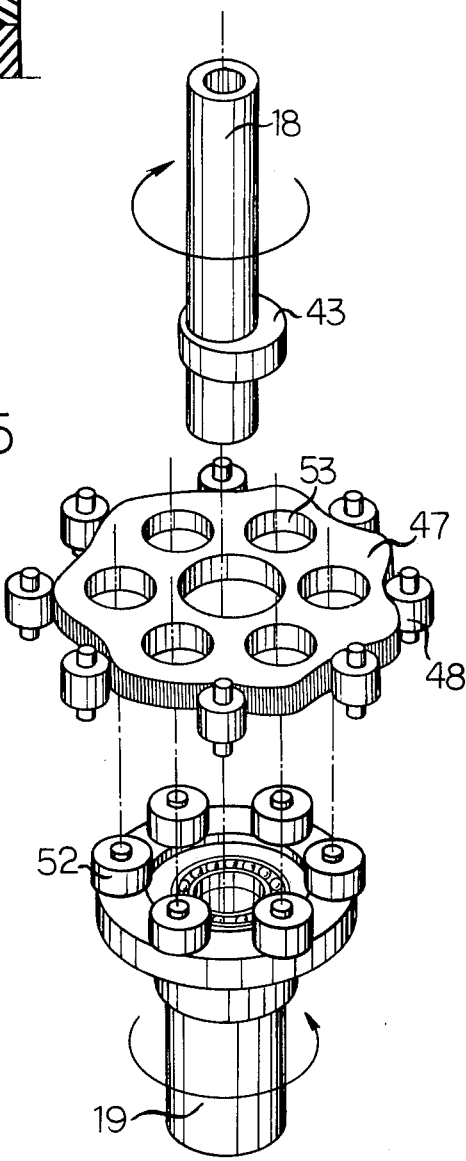
FIG. 5 is a perspective view showing the reduction gear of FIG. 4.

FIG. 4 and FIG. 5 show another embodiment of the reduction unit 17. In that case, the construction is different from the above-mentioned one. An eccentric ring 43 is mounted on the input shaft 18 and fixed by a key 44 thereon. The eccentric ring 43 is retained axially by means of such snap rings 45, 46. A planetary gear 47 formed peripherally with teeth (number of teeth: P) which are in a shape of trochoid curve is mounted slidably on the eccentric ring 43.

An internal gear having rollers 48 (number of the roller: S) supported slidably on pins 49 which are secured at equal circular pitch to pin holder 50 is in meshing engagement with the planetary gear 47. Inner pins 51 equipped with inner rollers 52 which are rotatably supported therearound are fixed to a flange extending radially from the output shaft 19. With the inner rollers 52 so adapted that they can rotate in holes 53 formed in the planetary gear 47 with a small clearance therebetween and partially contact with the inner surface thereof, the rotation of the planetary gear 47 on its axis is employed for that of output shaft 19. FIG. 5 shows perspectively an arrangement of the input shaft 18, eccentric ring 43, planetary gear 47, inner rollers 52 and output shaft 19.

An end plate 23 and the outer pin holder 50 are secured to the gear box 12 by means of extended bolts 24. The input shaft 18 is supported by bearings 25, 26. Since other constructions such as sealing device for preventing oil leakage from oil room 31 to piercing holes 36, 37 are quite similar to those of FIG. 3, the descriptions thereof are omitted. In the planetary gear of this type employing a planetary gear 47 and internal gear with rollers, the planetary gear 47 being revolved around an axis of the input shaft by means of the eccentric ring mounted on the input shaft, the rotation of the planetary gear 47 on its axis caused by meshing engagement with the internal gear or the rollers 48 is employed for rotation of the output shaft 19 through the inner rollers 52. The reduction ratio between the output shaft and input shaft obtained in this gear arrangement is (S − P)/P, as well known in the art. In case that the difference in number of teeth between the internal gear and the planetary gear 47 is one, high reduction ratio 1/P is obtainable.

Figure 6:
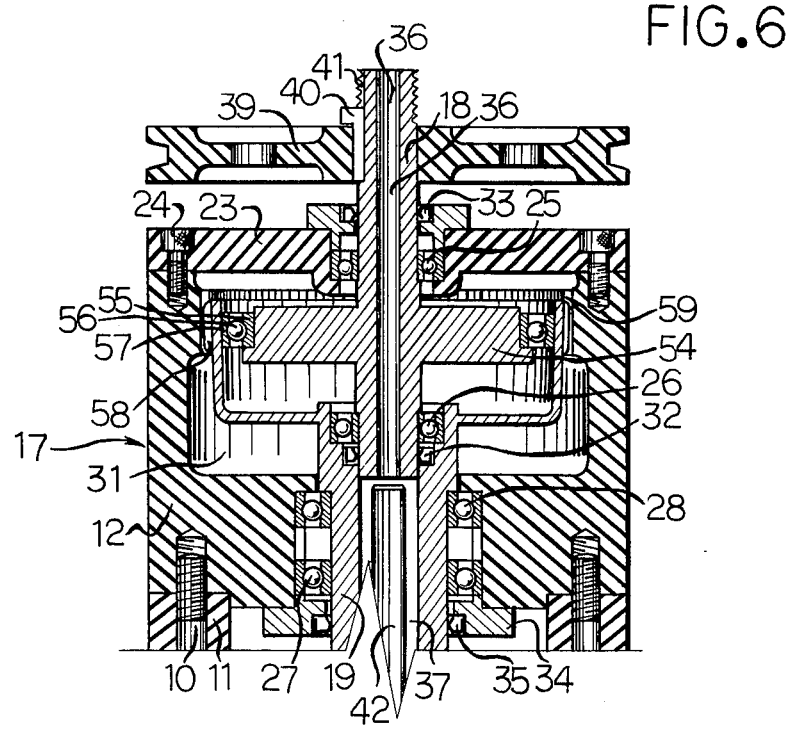
FIG. 6 is a longitudinal section view showing another embodiment of a reduction gear in the extruding unit of FIG. 3.
Figure 7:
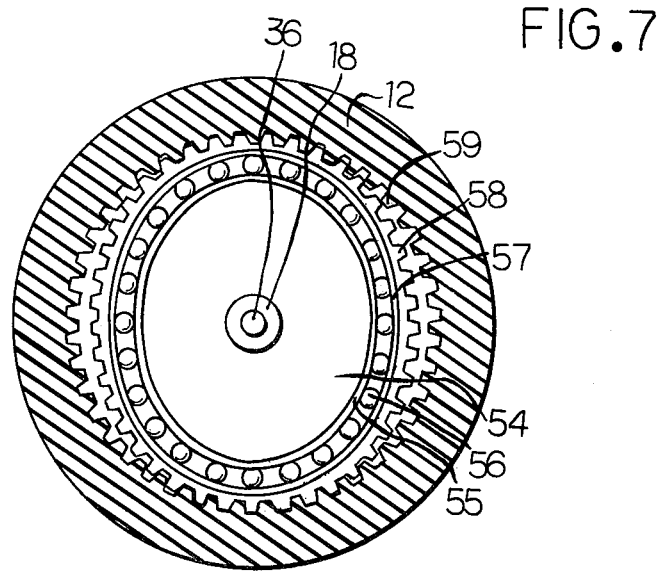
FIG. 7 is a transverse section view showing the reduction gear of FIG. 6.

FIG. 6 and FIG. 7 show another embodiment of the reduction unit of the invention. In this embodiment, a wave-generator or oval cam 54 is mounted fixedly on an input shaft 18. With the rotation of the input shaft 18, an outer ring 57 can be deformed cyclically and elliptically owing to the rotation of the balls 56 around the inner ring 55 on the oval cam 54. That is, when the outer ring 57 is locked against turning, an oval shape rotates at the same speed as the oval cam 54. A flexible planetary gear 58 (number of teeth: P) mounted around the outer ring 57 is also deformed elliptically with the rotation of the oval cam 54.

Since a major axis of a pitch oval diameter of the flexible planetary gear 58 is so arranged that it is the same as the pitch circle diameter of an internal gear 59 (number of teeth: S) formed in the gear box 12, the flexible planetary gear 58 can be precisely engaged with the internal gear 59 at neighborhood of the major axis thereof.

On the other hand the portion adjacent to the minor axis is not in meshing engagement with the internal gear 59, and therefore the meshing portion between the planetary gear 58 and the internal gear 59 is changeable cyclically with the rotation of the oval cam 54.

Since the internal gear 59 is at rest, the flexible planetary gear 58 which possesses number of teeth less than that of the internal gear 59 rotates in reverse direction against the rotating direction of the oval cam 54 and revolves the output shaft 19 formed therewith.

An end plate 23 is fixed on the gear box 12 by means of extended bolts 24. The input shaft 18 is rotatably supported on the bearings 25, 26. Since other constructions such as sealing device for preventing oil leakage from oil room 31 into piercing holes 36, 37 are quite similar to those of FIG. 3, the descriptions thereof are omitted. In the planetary gear of the type employing a planetary gear 58 and an internal gear 59, the planetary gear is substantially revolved around the axis of the input shaft 18 by means of the oval cam 54, and the rotation thereof on its axis caused by meshing engagement with the internal gear 59 is employed for the rotation of the output shaft 19 through a flexible cylindrical portion of the planetary gear 58. The reduction ratio obtained by this mechanism is (S − P)/P, as is clear by those skilled in the art.

When S − P is two, since S − P (difference in number of teeth between the planetary gear 58 and internal gear 59) should be even-numbered in case of employing an oval cam, a high reduction ratio, that is 2/P, is obtainable. Instead of the oval cam as is employed in this embodiment for a wave-generator, an eccentric circular cam or polygonal cam including trianglar cam, the corners of which are chamfered, is also available. The reduction ratio is 1/P for the eccentric circular cam and is N/P for N-polygonal cam.

Figure 8:
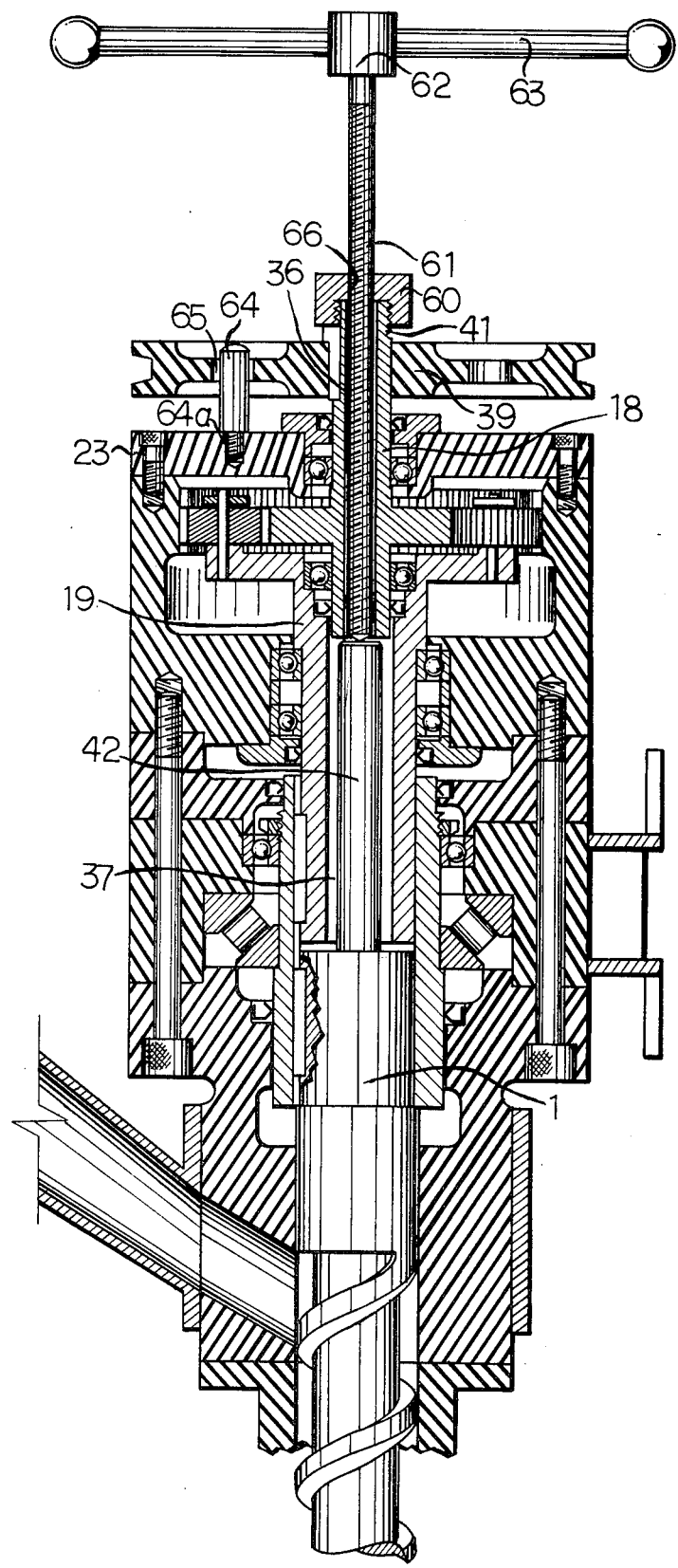
FIG. 8 is a longitudinal section view showing an embodiment of a device for removing the screw from the screw unit in the extruder of FIG. 1.

FIG. 8 shows the detail of the device for removing the screw from the screw unit 104.

A cap nut 60 having a threaded hole 66, into which a threaded bar 61 is insertionable, is threaded onto the threaded end 41 in the input shaft 18. And end member 62 provided with a handle 63 is secured to the head of the threaded bar 61.

The threaded bar 61 having enough length to push the end of elongated boss 42 of the screw 1 can remove the screw 1 from the screw unit 104 as a result of movement of the threaded bar 61 along the piercing hole with the rotation of the handle 63. Preferably, the input shaft 18 should be locked against rotation by means of a stopper 64 which extends through a hole 65 formed in pulley 39 and is threaded into the threaded hole 64a formed at the end plate 23 of the gear box 12, and the thus threaded bar 61 can be moved longitudinally without rotating the input shaft 18.

It has been found that the movable extruder of the invention having an extruding means on a column standing on a pedestal can readily obtain a suitable low speed for operating a screw through high speed in prime mover by means of a reduction gear with a high reduction ratio, that is, planetary gear.

Further the extruder of the invention is quite stable and free from troubles such as turning over during the transportation and operation thereof, even when the extruding means is located at a high position on the column, since the extruding means is devided into well balanced extruding unit and prime mover and it can be mounted closely on the column due to its compactness.

Besides, the pumping system for cooling the lubricant is unnecessary for the screw extruder of the invention owing to the high efficiency of the planetary gear adopted therein. It is difficult to employ such pumping system for the movable extruder, and particularly for the extruder having an inclinable extruding means.

The extruder of the invention, in spite of the column type, is quite silent and small in vibration owing to the planetary gear having well-balanced transmission elements.

Furthermore, although the extruder of the invention employs a planetary gear having an output shaft and input shaft aligned in a line, it is easy to remove the screw from the screw unit due to the splended idea which employs piercing holes through the shafts and is also free from oil leakage into the piercing holes from oil room owing to the good sealing construction.

It will be understood that an embodiment of the invention hereinbefore shown and described is a preferred example and that various modifications may be carried out without aparting from the spirit of the present invention or the scope.

What we claim is:

1. In a screw extruder for molding plastics material having an extruding means mounted on a column standing on a pedestal, the improvement wherein the extruding means comprising:
   a prime mover;
   an extruding unit, separated from the prime mover, having a screw unit with a screw and a speed reduction unit composed of planetary gear which transmits power to the screw unit, the reduction unit having an output shaft and input shaft aligned with the screw in turn, the output shaft being formed with a piercing hole extending therethrough, and the input shaft being formed with a piercing hole extending therethrough and communicating with the hole of the output shaft to permit removal of said screw; and
   a transmission assembly for transmitting power from the prime mover to the input shaft of the reduction unit.

2. The screw extruder of claim 1, wherein the piercing hole of the input shaft and the piercing hole of the output shaft are substantially incorporated in a space by a sealing mechanism to preclude the oil leakage from an oil space thereinto.

3. The screw extruder of claim 2, wherein the sealing mechanism comprises a boss extending from an end of the output shaft and being inserted in a hole formed at an opposing end of the input shaft and an oil seal positioned between the boss and the hole.

4. The screw extruder of claim 2, wherein the sealing mechanism comprises a boss extending from an end of the input shaft and being inserted into a hole formed at an opposing end of the output shaft and an oil seal positioned between the boss and the opposing hole.

5. The screw extruder of claim 2, wherein the sealing mechanism includes an oil seal which is mounted on at least one shaft selected from the group consisting of the input shaft and the output shaft and is capable of sealing a gap between the opposing ends of shafts by face to face sealing contact.

6. The screw extruder of claim 1, wherein the transmission assembly is formed by a belt and a pulley assembly.

7. The screw extruder of claim 1, wherein the input shaft is provided with a device for removing the screw from the screw unit.

8. The screw extruder of claim 7, wherein the device for removing the screw from the screw unit comprises a threaded end formed at the end of the input shaft, a cap nut threaded onto the threaded end of the input shaft and having a threaded hole and a threaded bar which is insertionable into the threaded hole of the cap nut.

* * * * *